H. E. BEHRENS.
GRAIN SEPARATOR.
APPLICATION FILED FEB. 14, 1919.
1,346,630.
Patented July 13, 1920.
2 SHEETS—SHEET 1.
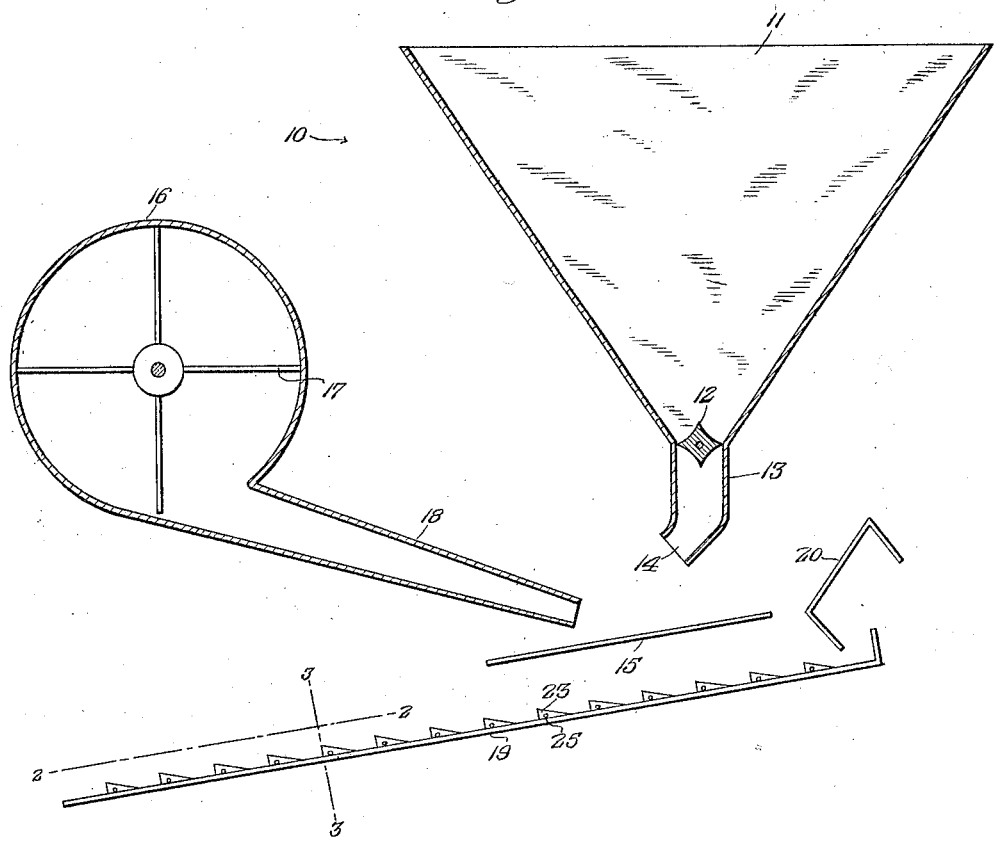
Fig. 1.
Fig. 3.
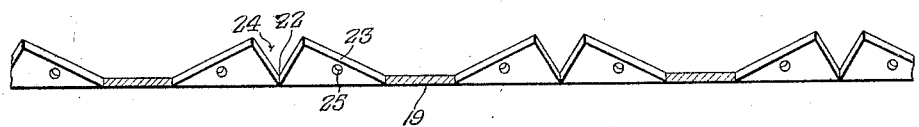
WITNESSES:
J. H. Crawford
INVENTOR
H. E. Behrens,
BY
Victor J. Evans
ATTORNEY H. E. BEHRENS.
GRAIN SEPARATOR.
APPLICATION FILED FEB. 14, 1919.
1,346,630.
Patented July 13, 1920
2 SHEETS—SHEET 2.
Fig.2.
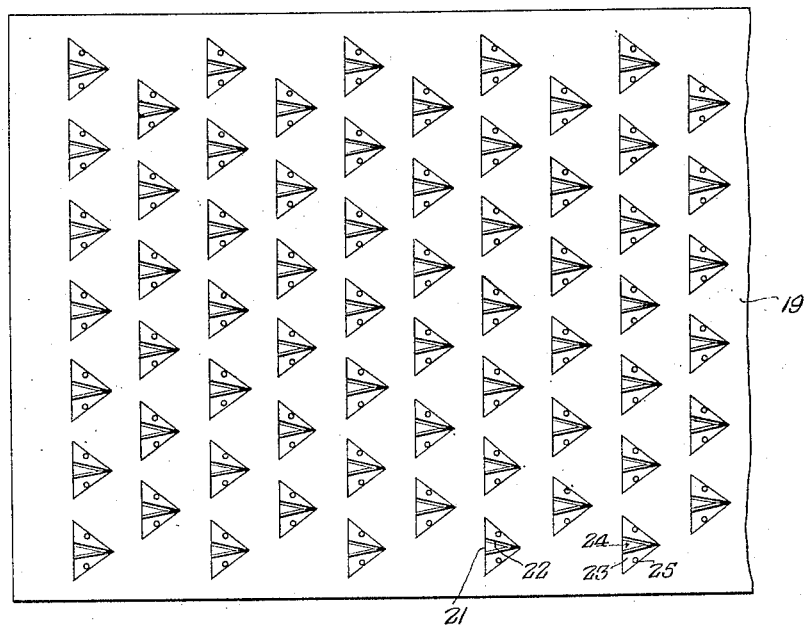
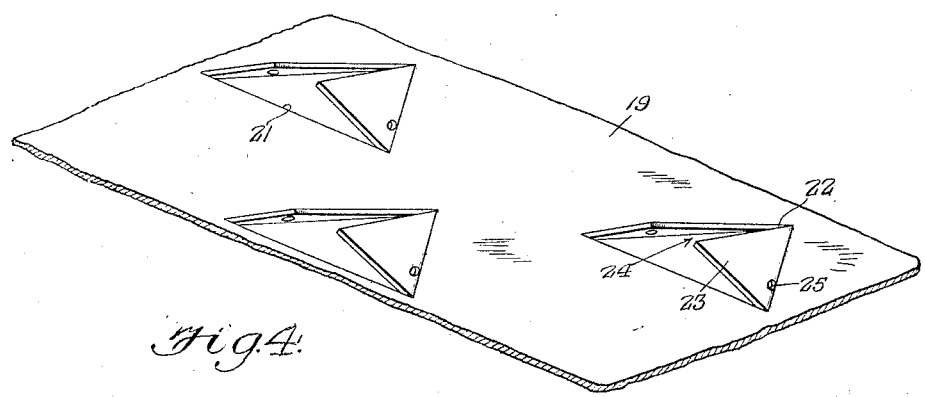
Fig.4.
WITNESSES:
J.H.Crawford
INVENTOR
H.E.Behrens,
BY
Victor J. Evans
ATTORNEY

UNITED STATES PATENT OFFICE.

HUGO E. BEHRENS, OF FARGO, NORTH DAKOTA.

GRAIN-SEPARATOR.

1,346,630.  Specification of Letters Patent.  Patented July 13, 1920.

Application filed February 14, 1919. Serial No. 277,010.

*To all whom it may concern:*

Be it known that I, HUGO E. BEHRENS, a citizen of the United States, residing at Fargo, in the county of Cass and State of North Dakota, have invented new and useful Improvements in Grain-Separators, of which the following is a specification.

This invention has reference to improvements in grain separators.

The object of the invention is to produce a simple device of this character whereby kinghead and cockle seed will be easily and effectively separated from the wheat.

Other objects and advantages will appear as the nature of the invention is better understood, reference being had to the accompanying drawings, in which:

Figure 1 is a vertical longitudinal sectional view through a separator constructed in accordance with this invention.

Fig. 2 is a sectional view approximately on the line 2—2 of Fig. 1.

Fig. 3 is a greatly enlarged sectional view approximately on the line 3—3 of Fig. 1.

Fig. 4 is a perspective view of a portion of the screen.

Referring now to the drawings in detail, the separator is broadly indicated by the numeral 10, having at one end thereof a hopper 11. In the outlet mouth of this hopper is a revoluble feed 12, any suitable power being employed for turning the said feed, and the feed is in the nature of a rectangular strip preferably provided with extending corners. At the outlet mouth of the hopper 11 is arranged a directing spout 13 having an angle outlet 14 directed inward of the separator and being disposed a considerable distance above a pan 15. In the separator is arranged a fan casing 16 having a revoluble fan 17 therein, the casing being provided with an outlet spout that is disposed at a downward angle and which is arranged over the pan 15. The spout is indicated by the numeral 18.

Below the pan 15 is an angularly arranged sieve 19, and to the rear of the sieve is an angularly disposed deflector plate 20. The deflector plate is arranged at an outward angle, while the sieve 19 is arranged at a downward angle. The deflector 20 is positioned only a slight distance from the pan 15, and as the wheat is fed from the hopper and is delivered onto the pan 15 through the spout 14, the blasts of air from the fan 17 through the spout 18 will bring light foreign matter, such as kinghead, etc., over the pan into contact with the angle deflector 20, and from thence out of the separator, the wheat grain being delivered from the fan onto the sieve 19.

The sieve 19 is of a particular and peculiar construction, comprising a flat plate formed with spaced series of contact members for the grain. These contact members are provided by slitting the plate 19 transversely, as at 21, and longitudinally as at 22. The plate may be scored from the ends of the slits 21 and 22, and the metal bounded by the slits is bent upwardly at an angle providing ears 23 and substantially V-shaped openings 24 between the ears. Each of the ears is provided with a round opening 25, and through these openings the cockle seed which are smaller than the wheat seed are passed when the grain gravitates on the sieve 19.

It is believed, from the foregoing description, when taken in connection with the drawings, the simplicity and advantages of the construction will be readily apparent without further detailed description.

Having thus described the invention, what is claimed as new is:—

In combination with a grain separator having a feed plate a sieve disposed below and spaced from said plate, said sieve comprising a body having converging ears upstruck therefrom and arranged in pairs thereon and providing V-shaped openings below the same, each of said ears having an aperture therein.

In testimony whereof I affix my signature.

HUGO E. BEHRENS.